United States Patent [19]

Hill et al.

[11] 3,828,830
[45] Aug. 13, 1974

[54] APPARATUS FOR WINDING AND PLACING COILS IN THE SLOTS OF A STATOR

[75] Inventors: Donald E. Hill; Stanley D. Payne, both of Fort Wayne, Ind.; Robert G. Walker, Brighton, Mich.

[73] Assignee: Industra Products Inc., Fort Wayne, Ind.

[22] Filed: Jan. 16, 1969

[21] Appl. No.: 791,704

[52] U.S. Cl.................. 140/1, 29/205 R, 140/92.1
[51] Int. Cl.............................................. B21f 3/04
[58] Field of Search........ 140/1, 92.1, 92.2; 29/205, 29/596, 605

[56] References Cited
UNITED STATES PATENTS

| | | | |
|---|---|---|---|
| 1,396,033 | 11/1921 | Francis | 140/92.9 |
| 3,036,603 | 5/1962 | Moore | 140/92.1 |
| 3,481,372 | 12/1969 | Eminger et al. | 140/92.1 |
| 3,557,432 | 1/1971 | Pavesi | 140/92.1 |

Primary Examiner—Charles W. Lanham
Attorney, Agent, or Firm—Koenig, Senniger, Powers & Leavitt

[57] ABSTRACT

Apparatus for winding and placing coils in the slots of a stator, comprising a rotary index table carrying two sets of placer fingers spaced at 180° intervals, each set being adapted to hold two pole windings for a stator, a rotary indexing winding head carrying two pairs of coil forms spaced at 180° intervals, and a flyer for winding a wire into two groups of coils constituting two pole windings on the pair of coil forms at a winding station. After winding of the two pole windings on the pair of coil forms at the winding station, the winding head is indexed to bring this pair to a transfer station, where the two pole windings are transferred to a set of fingers on the table at the transfer station. After the transfer, the table is indexed to bring this set of fingers carrying the two pole windings to a placing station, where the two pole windings are pushed into the slots of a stator applied to the fingers.

15 Claims, 23 Drawing Figures

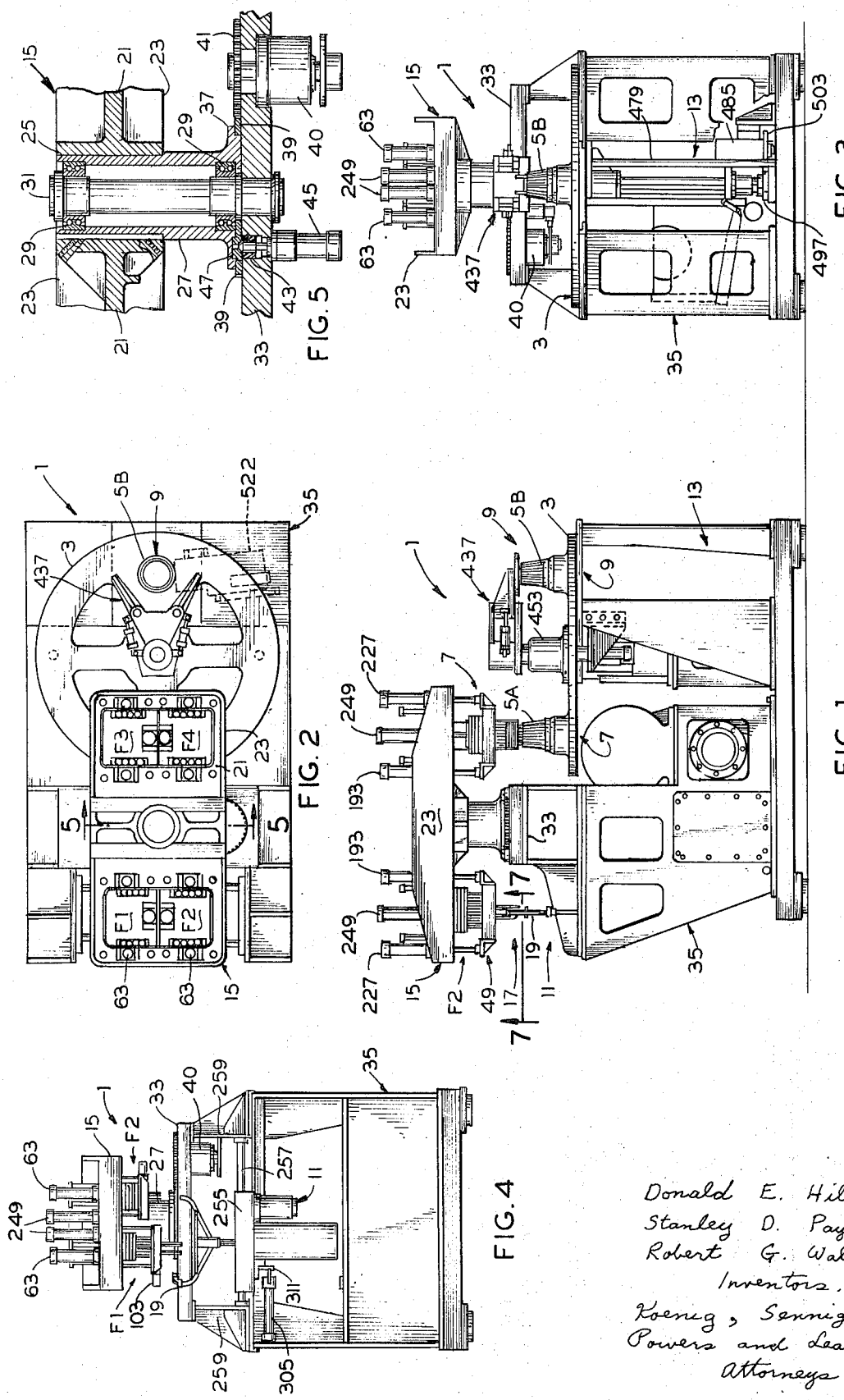

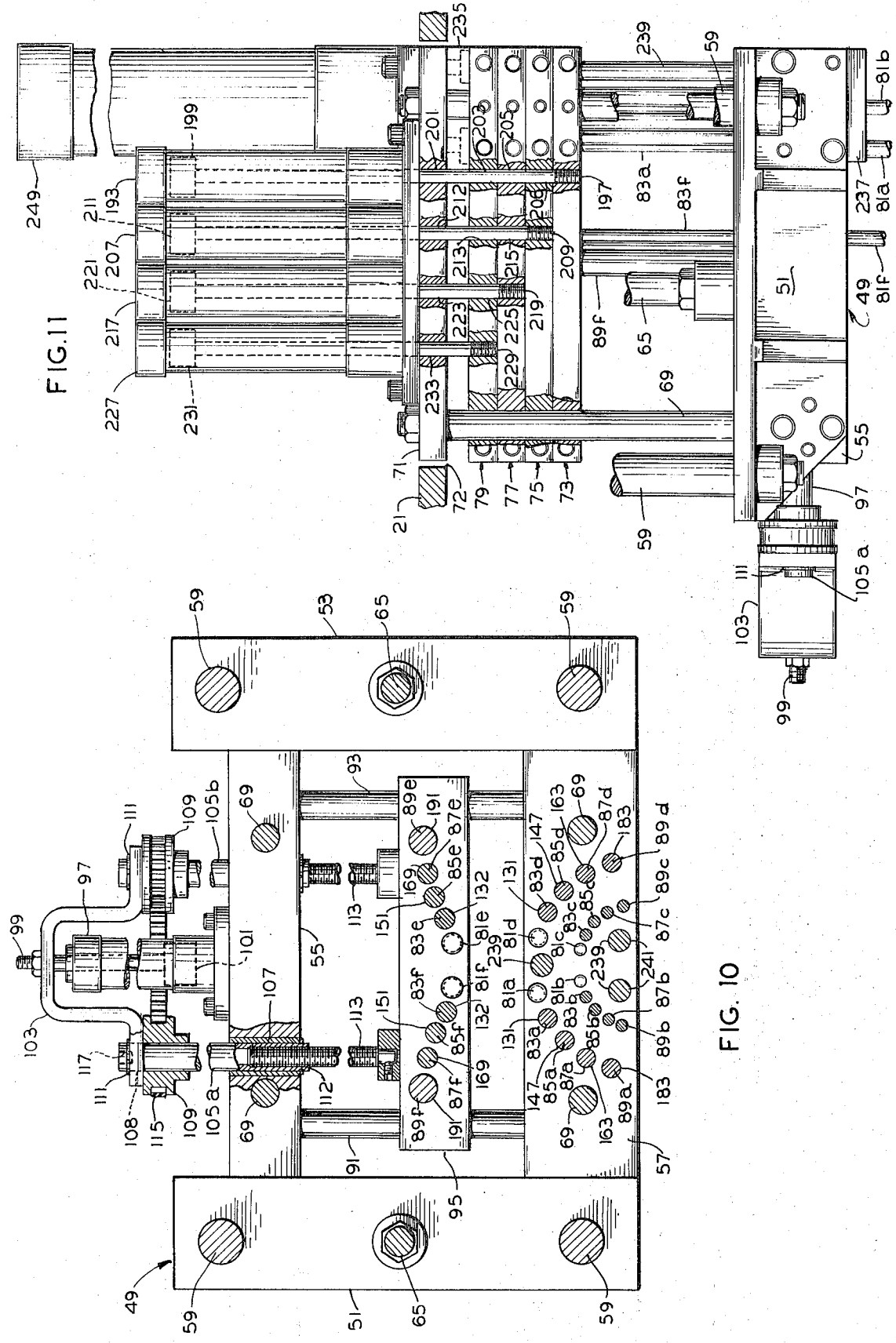

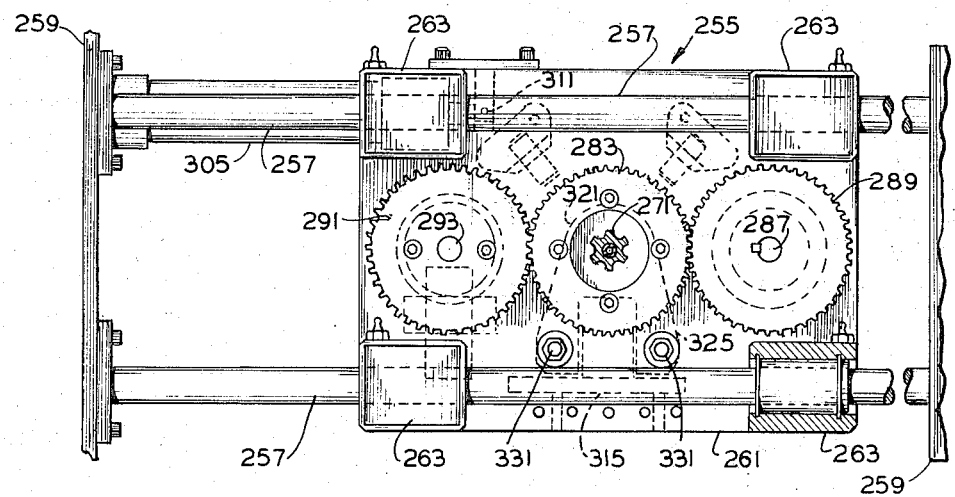
FIG. 16
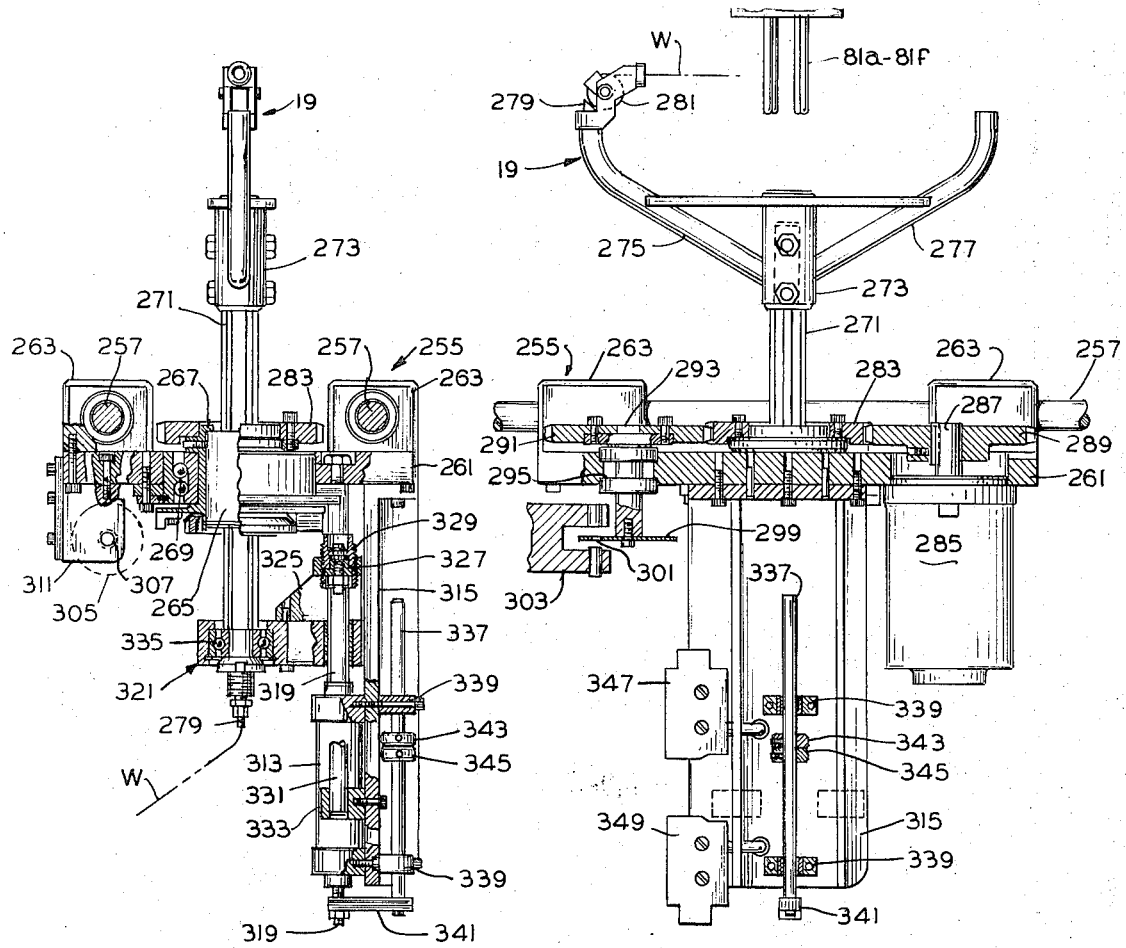
FIG. 18
FIG. 17

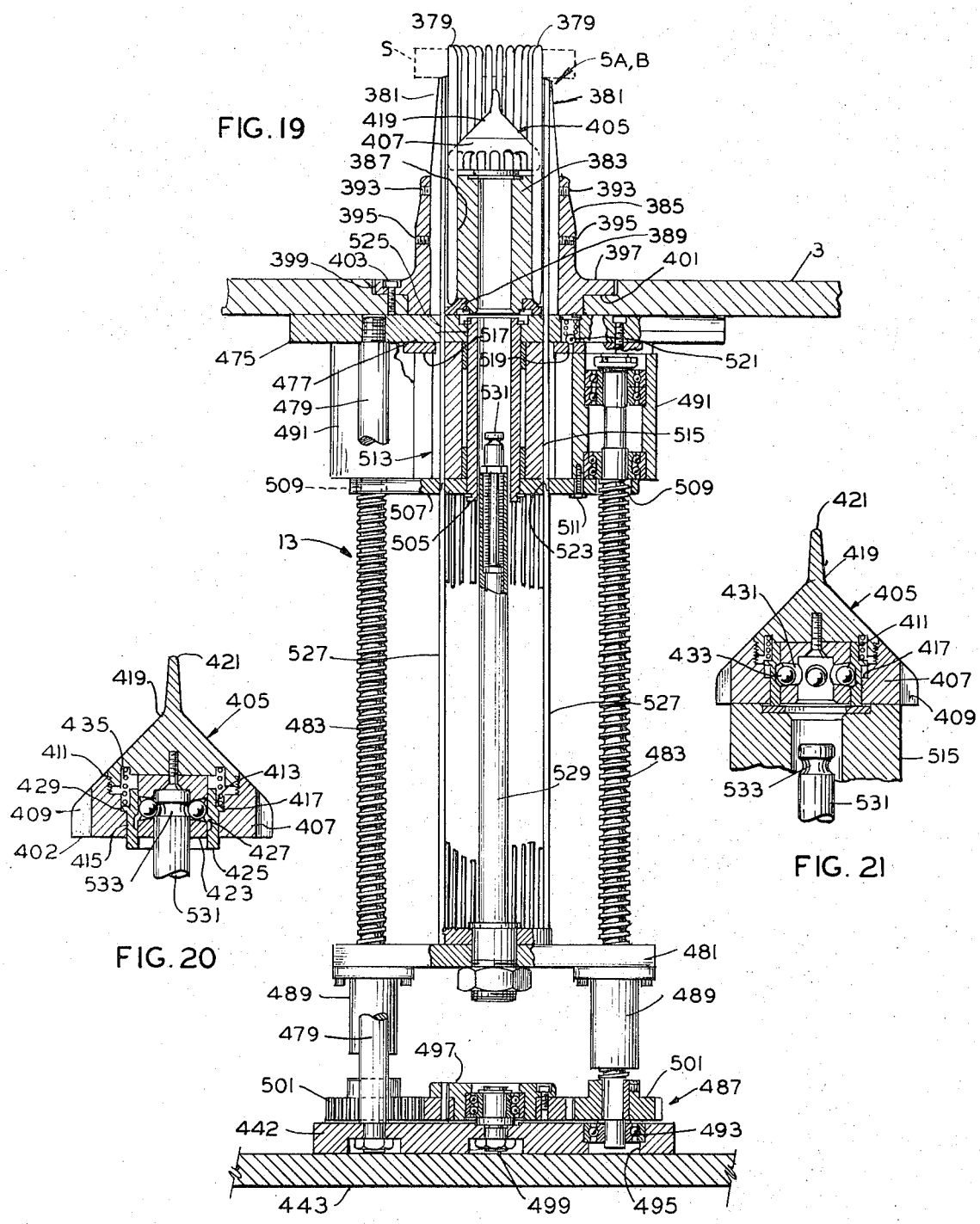

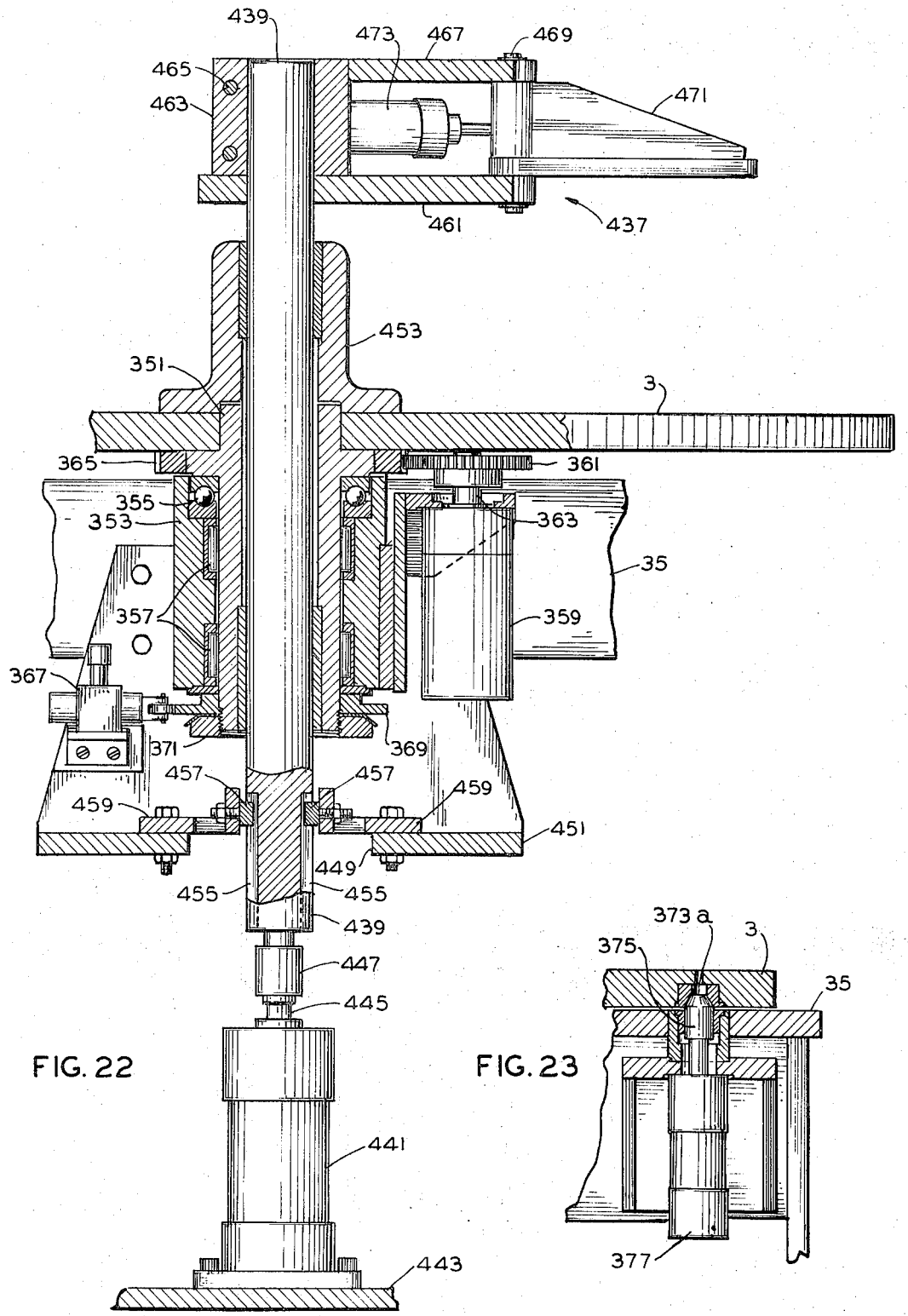

APPARATUS FOR WINDING AND PLACING COILS IN THE SLOTS OF A STATOR

BACKGROUND OF THE INVENTION

This invention relates to apparatus for winding and placing coils in the slots of a stator, e.g., the stator of an electric motor, alternator or the like, and more particularly to such apparatus for winding and placing two pole windings in the slots of a stator for a two-pole motor.

It will be understood that the stator of an electric motor conventionally has a circular bore (for the armature of the motor) and axially extending slots in radial planes extending out from the bore, coils of wire constituting the stator winding being lodged in the slots. The coils are generally disposed in groups each including a plurality of coils of different sizes, each group constituting an individual pole winding of the stator. Various approaches have been taken to the problem of providing the windings in the stator slots, including winding the coils directly in the slots, and prewinding the coils and placing the prewound coils in the slots. One example of the latter is found in U.S. Pat. No. 3,151,638. Reference may also be made to U.S. Pat. No. 3,324,536 showing apparatus for placing prewound coils in the slots by placing the coils on a set of fingers, applying a stator to the fingers, and pushing the coils off the fingers into the slots. A problem which has continued to exist is that of providing apparatus for efficiently winding and placing the coils with high production rates and minimizing of manual operations. For example, as to the apparatus shown in U.S. Pat. No. 3,151,638, only one pole winding can be placed in a stator at a time, necessitating a plurality of placing operations for placing multiple pole windings. This invention is directed toward solving this problem, and in particular as to winding and placing two pole windings in the slots of a stator.

SUMMARY OF THE INVENTION

Among the several objects of this invention may be noted the provision of improved apparatus for winding and placing coils of wire in the slots of a stator (e.g., an electric motor stator) which efficiently carries out the operations of winding coils and placing them in the stator slots with a minimum of manual operations; the provision of such apparatus adapted simultaneously to place a plurality of windings, e.g., two pole windings, in the slots of a stator; the provision of such apparatus adapted to carry out the winding of coils concurrently with the placing of coils in the slots of a stator for increasing production rates; the provision of such apparatus adapted for winding different-sized groups of coils; and the provision of such apparatus adapted for successive winding of two pole windings on two adjacent coil forms by a single flyer.

In general, apparatus of this invention comprises an indexing conveyor, e.g., a rotary index table, carrying a plurality of placer heads, e.g., two placer heads each comprising a circular array of fingers, at spaced intervals thereon, each placer head being adapted to hold coils for placement in the slots of a stator applied to the head. Means is provided for winding coils and transferring them to a placer head. Means is provided for indexing the conveyor to bring a placer head carrying coils which have been transferred thereto to a placing station, and means is provided at the placing station for pushing the coils from that placer head into the slots of a stator applied to that placer head. Other objects and features will be in part apparent and in part pointed out hereinafter.

BRIEF DESCRIPTION OF THE DRAWINGS

FIG. 1 is a view in side elevation of an apparatus constructed in accordance with this invention especially for winding and placing two pole windings in the slots of stators for two-pole electric motors;

FIG. 2 is a plan of FIG. 1;

FIG. 3 is a right end elevation of FIG. 1;

FIG. 4 is a left end elevation of FIG. 1;

FIG. 5 is an enlarged vertical section on line 5—5 of FIG. 2;

FIG. 10 is a horizontal section on line 10—10 of FIG. 9;

FIG. 11 is a side elevation of FIG. 9 with parts broken away and shown in section;

FIG. 16 is a plan, with parts broken away and shown in section, of a winding assembly of the apparatus;

FIG. 17 is a view in elevation, with parts broken away and shown in section, of part of FIG. 16;

FIG. 18 is a left end view of FIG. 17, with parts broken away and shown in section;

FIG. 19 is a vertical section on line 19—19 of FIG. 8;

FIGS. 20 and 21 are vertical sections showing certain stripper mechanism of the apparatus;

FIG. 22 is a vertical section on line 22—22 of FIG. 8; and

FIG. 23 is a detail section on line 23—23 of FIG. 8.

Corresponding reference characters indicate corresponding parts throughout the several views of the drawings.

DESCRIPTION OF THE PREFERRED EMBODIMENTS

Figure 6:
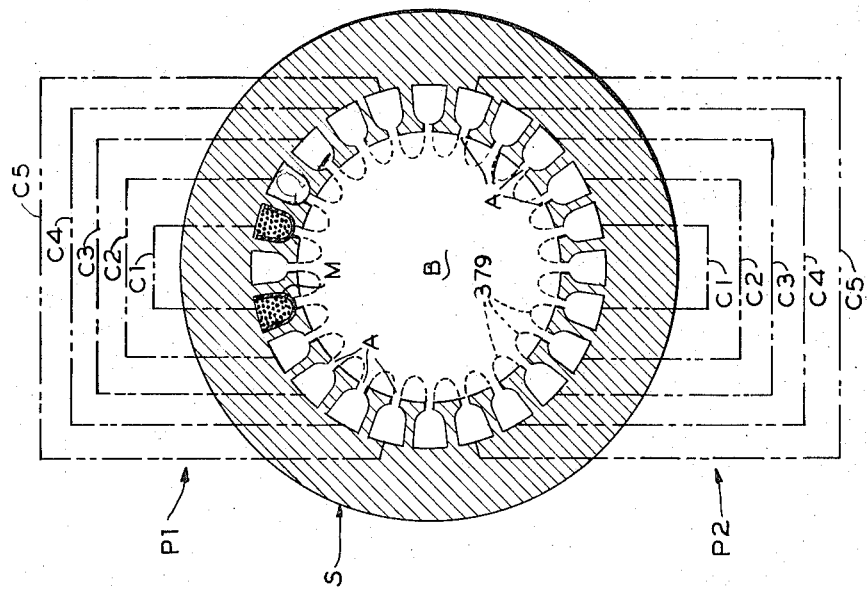
FIG. 6 is a semidiagrammatic view illustrating a typical stator with a typical two-pole winding placed therein.
Figure 7:
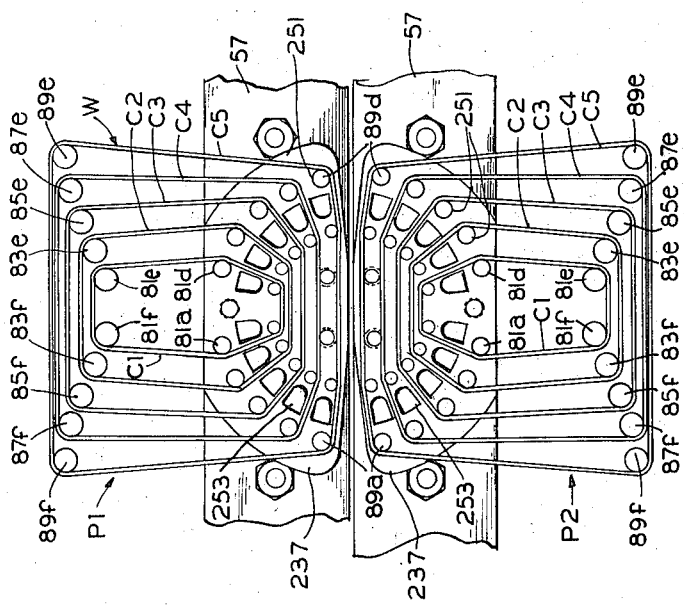
FIG. 7 is an enlarged view on line 7—7 of FIG. 1 showing two pole windings wound on a pair of coil forms of the apparatus.

Referring first to FIGS. 1-4, there is generally indicated at 1 apparatus made in accordance with this invention for winding and placing two pole windings in stators for two-pole electric motors. Referring more particularly to FIG. 6, a typical stator and winding assembly produced by the apparatus is shown to comprise a stator S having a circular bore B, axial slots A radiating outward from the bore, and two pole windings P1 and P2 received in the slots. Each of these pole windings comprises a set of coils generally denoted by the reference character C. As herein illustrated, by way of example, each set of coils consists of five coils, specifically denoted C1–C5 (see also FIG. 7). The coils of each set increase progressively in size from C1–C5. The coils in both sets are wound from a wire W without severance of the wire between the coils in each set and without severance of the wire between sets. Each coil has two straight parallel sides which are lodged in two of the slots, and end portions at the end faces of the stator. Also, as shown in FIG. 6, the stator and winding assembly includes a strip of insulating material M in each of the slots occupied by the sides of the coils, these strips being referred to as "bore wedges." The apparatus 1 is adapted to form the pole windings P1 and P2 and place these windings along with the bore wedges M in their respective stator slots.

Figure 8:
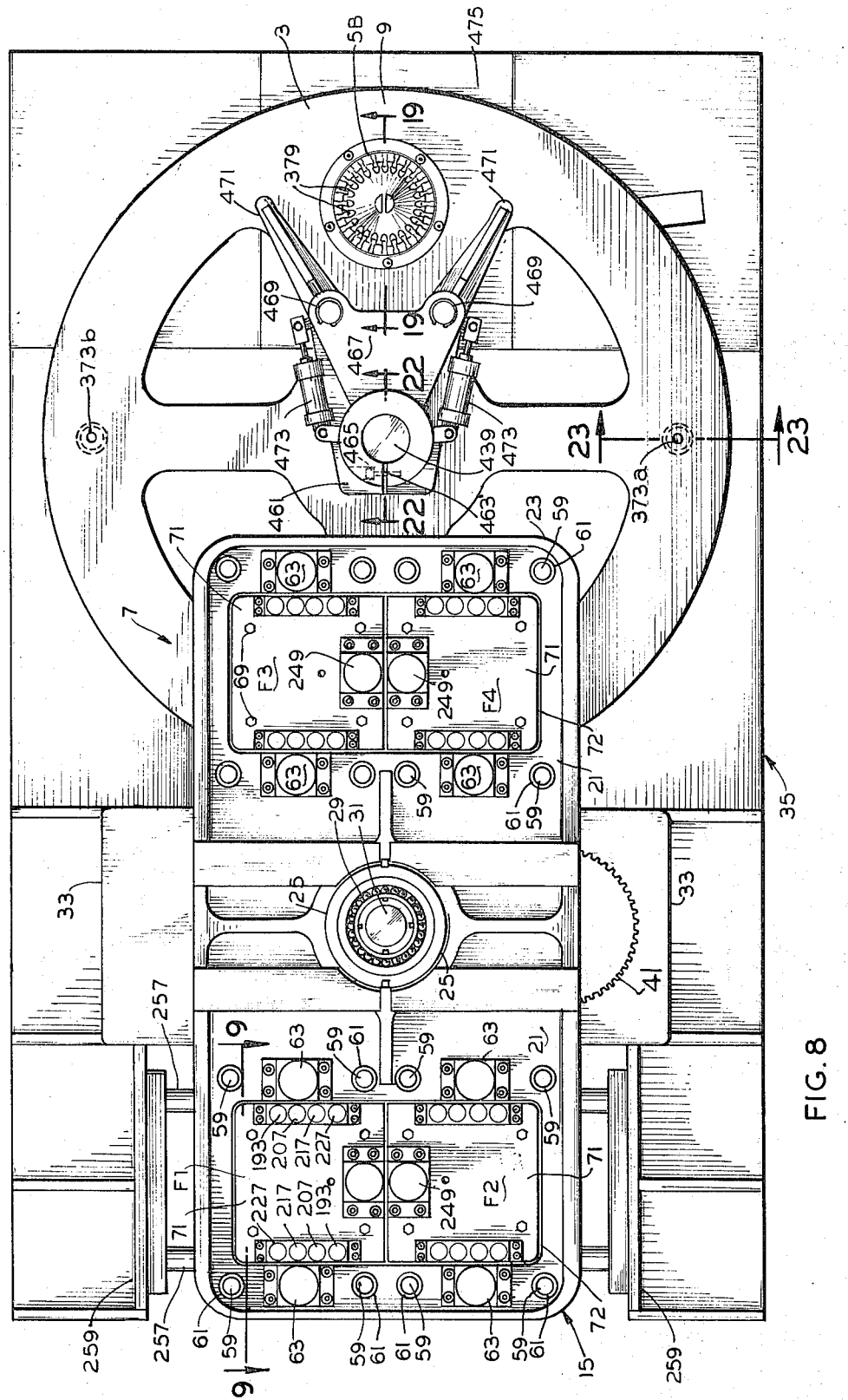
FIG. 8 is an enlarged plan of the apparatus.

The apparatus 1 generally comprises a circular index table 3 rotatable on a vertical central axis carrying two multi-fingered placer heads 5A and 5B spaced at 180° intervals around the table, thus being located diametrically opposite one another. Each placer head is adapted to have two pole windings P1 and P2 positioned thereon for placement of these windings in the slots of a stator S applied to the head above the pole windings. The index table is rotatable in 180° steps to index one of the placer heads from a coil transfer station 7 to a coil and bore wedge placing station 9 and concomitantly to bring the other placer head from the coil and bore wedge placing station 9 to the coil transfer station 7. At 11 is generally indicated a coil winder for winding coils and having means incorporated therein for transferring wound coils therefrom to the placer head 5A or 5B which is at the transfer station. After coils have been transferred to the placer head at the transfer station, the table is indexed to bring that placer head to the coil-placing station 9, at which there is a coil and wedge driving unit 13 adapted for operation to drive the coils on the placer head at the placing station into the slots of a stator S applied to that head, and simultaneously drive bore wedges M into the slots. FIGS. 1, 2 and 8 show the placer head 5A at the transfer station 7 and the placer head 5A at the placing station 9.

The coil winding 11 comprises a winding head or turret 15 (see FIGS. 1–5 and 8) rotatable on a vertical central axis carrying a first pair of coil forms generally designated F1 and F2 and a second pair of coil forms generally designated F3 and F4, these pairs being spaced at 180° intervals around the head, thus being located diametrically opposite one another. Each of the coil forms F1–F4 is adapted for the winding therein of one set (one pole winding) of coils. The turret 15 is rotatable in 180° steps to index one of the pairs of coil forms from a winding station 17 to the transfer station 7 and to bring the other pair of coil forms from the transfer station to the winding station. Two sets of coils (two pole windings) are wound on the pair of coil forms at the winding station while two sets of coils (two pole windings) previously wound are transferred from the pair of coil forms at the transfer station to the placer head 5A or 5B at the transfer station. Thus, a complete two-pole stator winding is wound on the pair of coil forms at the winding station while a complete two-pole stator winding is being transferred from the pair of coil forms at the transfer station to the placer head which is at the transfer station.

At the winding station 17 is a winding assembly including a flyer 19 which is adapted first to wind a first group of coils (a first pole winding) on a first of the pair of coil forms at the winding station, and then to shift to wind a second group of coils (a second pole winding) on the second of the pair of coil forms at the winding station. For example, as shown in FIGS. 2 and 8 the pair of coil forms F1 and F2 is at the winding station. The flyer first winds a group of coils on form F1, then shifts to wind a group of coils on form F2. Meanwhile, two groups of coils previously wound are being transferred from forms F3 and F4 to the placer head 5A which is at the transfer station 7.

The turret 15, as shown, comprises a generally rectangular plate 21 having a peripheral flange 23 and a center hub 25. The hub is keyed on the upper end of a vertical sleeve 27 (see FIG. 5) journalled by means of ball bearings 29 for rotation on a vertical pin 31 which extends up from a table portion 33 of the frame of the machine, this frame being generally designated 35. The sleeve has a radially outwardly extending flange 37 at its lower end, to the bottom of which is attached a spur gear 39. Indexing of the turret is effected by means of an indexing drive motor 40 driving a pinion 41 in mesh with the gear 39. Motor 40 may be, for example, a conventional hydraulic vane-type rotary actuator adapted to rotate pinion 41 first in one direction to index turret 15 first through 180° in one direction and then to rotate pinion 41 in the opposite direction to index the turret through 180° in the opposite direction. It will be understood that suitable conventional valve means is provided for controlling motor 40 for this purpose. At 43 is indicated a detent actuated by a hydraulic cylinder 45 and engageable in either of two sockets 47 spaced at 180° around the flange 37 for latching the turret in its 180° indexed positions. It will be understood that suitable conventional valve means is provided for controlling cylinder 45 for this purpose.

Figure 9:
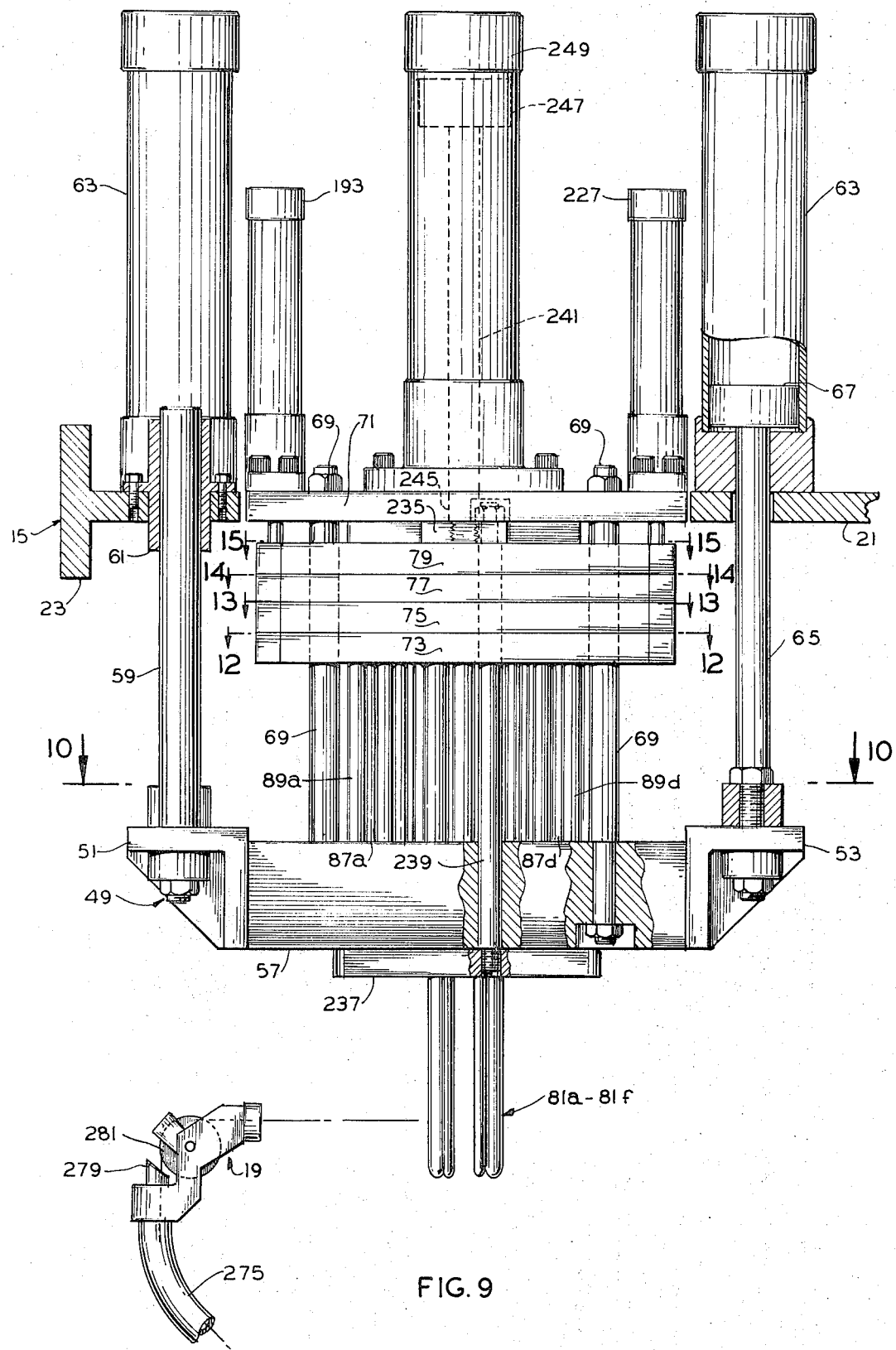
FIG. 9 is an enlarged vertical section on line 9—9 of FIG. 8, with parts further broken away and shown in section.

The four coil forms F1–F4 carried by the turret 15 are identical, and a description of one will suffice for all. Thus, as shown in FIGS. 9–11, each of the four coil forms comprises a vertically movable horizontally disposed carriage generally designated 49. This carriage is generally in the form of an open rectangular frame (see particularly FIG. 10) having angle-section side bars 51 and 53, and rectangular-section cross bars 55 and 57. It is disposed below the turret 15 and guided for vertical movement relative to the turret 15 by four guide rods 59 slidable in tubular guides 61 carried by plate 21 of the turret. Two of these rods extend up from the carriage side bar 51, and the other two extend up from the carriage side bar 53. A pair of hydraulic cylinders each designated 63 is provided for raising and lowering each carriage. Piston rods 65 extend down from pistons 67 in these cylinders through holes in plate 21 and have their lower ends connected to carriage side bars 51 and 53. The arrangement is such that the carriage 49 may be moved downward by its respective pair of cylinders 63 to the winding position in which it is shown in FIGS. 9 and 11, and raised by the cylinders to a retracted position, raised up from its FIGS. 9 and 11 position toward the turret 15, being guided in its vertical movement by the sliding of its respective guide rods 59 in the respective tubular guides 61. For each pair of cylinders 63, suitable conventional valve means is provided to effect the simultaneous action of the piston rods of the pair.

Rods 69 secured at their lower ends to the carriage crossbars 55 and 57 extend upward therefrom and have a table plate 71 mounted on their upper ends, the arrangement being such that rods 69 and plate 71 are movable up and down with the carriage. The turret plate 21 has two rectangular openings each designated 72, one for accommodating the table plates 71 of coil forms F1 and F2, the other for accommodating the table plates 71 of coil forms F3 and F4. Four slides 73, 75, 77 and 79 are mounted for up and down sliding movement on these rods 69, thus being vertically slidable relative to the carriage. These four slides are arranged one above another in series, slide 73 being the lower slide of the series. Extending down from the carriage 49 is a first set of six pins 81a–81f constituting an arbor around which the first coil C1 of the group of five coils C1–C5 is adapted to be wound by the flyer 19. Extending down from the slide 73 is a second set of six pins 83a–83f constituting a second arbor larger than the first around which the second coil C2 of the group of five coils is wound by the flyer. Extending down from slide 75 is a third set of six pins 85a–85f constituting a third arbor larger than the second around which the third coil C3 is wound by the flyer. Extending down from slide 77 is a fourth set of pins constituting a fourth arbor larger than the third around which the fourth coil C4 is wound by the flyer. Extending down from slide 79 is a fifth set of pins constituting a fifth arbor larger than the fourth around which the fifth coil C5 is wound by the flyer.

The carriage 49 has a pair of guide rods 91 and 93 extending horizontally parallel to one another between its crossbars 55 and 57 (see FIG. 10). A slide block 95 is slidable horizontally on these rods toward and away from the bar 57. An air cylinder 97 is mounted on the outside of crossbar 55, extending horizontally outward therefrom. A piston rod 99 extends from a piston 101 in cylinder 97 through the outer end head of the cylinder and has a yoke 103 on its outer end. Two adjusting screw members 105a and 105b extend from the yoke back through bushed openings 107 in the slide block. Each of these screw members has its outer end rotatable in a hole 108 in the yoke. A pulley 109 is fastened on each screw member on the inside of the yoke and a collar 111 is fastened on each screw member on the outside of the yoke to hold it against axial movement relative to the yoke while permitting it to rotate. Each of members 105a and 105b has a threaded bore 112 extending out from its inner end receiving the outer end of a screw 113 which has its inner end secured to block 95 and which extends outward therefrom. An endless belt 115 is trained around the pulleys 109. Member 105a has a socket 117 in its outer end for reception of a wrench to turn it, with concomitant turning of member 105b via the belt and pulley connection between members 105a and 105b. The arrangement is such as to provide for movement of the block 95 relative to bar 57 by means of air cylinder 97 between an expanded winding position relative to the bar 57, for winding of coils, and a collapsed coil-ejecting position closer to bar 57 for stripping of the wound coils from the coil form pins, as will appear, and for initial adjustment of the block to various winding positions, according to the size of coils to be wound. Pins 81a–81d of the first set of pins extend down from bar 57 of carriage 49 and pins 81e and 81f of this set extend down from slide block 95 of the carriage. Thus, pins 81e and 81f are laterally movable with the block 95 relative to pins 81a–81d between a winding position and a collapsed position.

Figure 12:
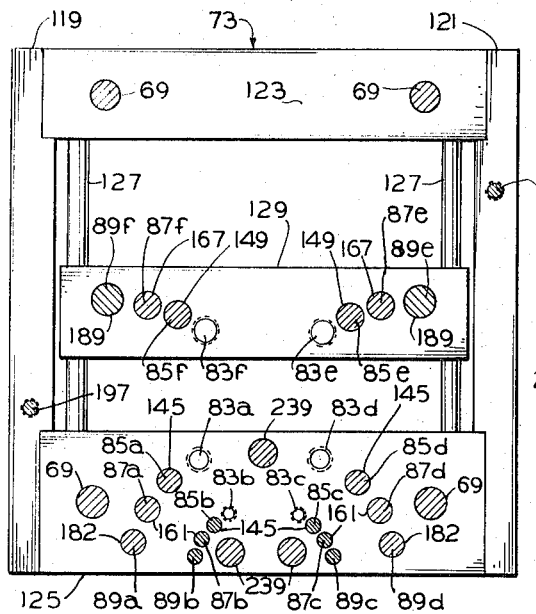
FIGS. 12-15 are horizontal sections on lines 12—12, 13—13, 14—14 and 15—15, respectively, of FIG. 9.

The slide 73 for the second set of coil pins, similarly to the carriage 49, is in the form of an open rectangular frame having side bars 119 and 121 and cross bars 123 and 125 with a pair of parallel guide rods 127 extending between the crossbars (see FIG. 12). A slide block 129 is slidable on rods 127 toward and away from crossbar 125. Pins 83a–83d of the second set of pins have their upper ends affixed in bar 125 of slide 73, and extend down from bar 125 through holes such as indicated at 131 in crossbar 57 of the carriage, being slidable in these holes. Pins 83e and 83f have their upper ends fixed in slide block 129 of slide 73 and extend down from slide block 129 through holes such as indicated at 132 in slide block 95 of the carriage, being slidable in these holes.

Figure 13:
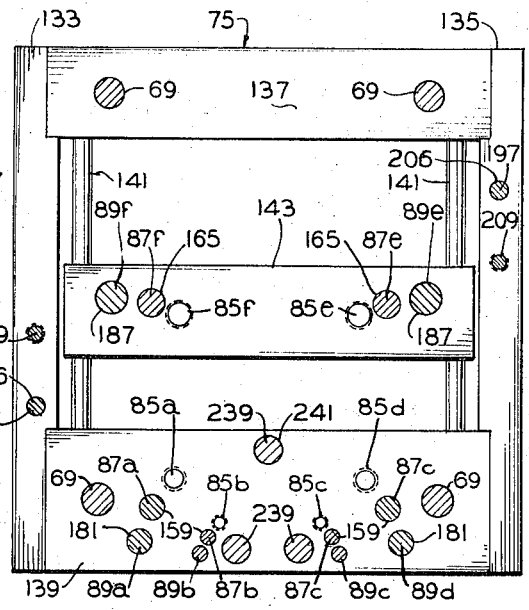

The slide 75 for the third set of coil pins is similarly in the form of an open rectangular frame having side bars 133 and 135 and crossbars 137 and 139 with a pair of parallel guide rods 141 extending between the crossbars (see FIG. 13). A slide block 143 is slidable on rods 141 toward and away from crossbar 139. Pins 85a–85d of the third set of pins have their upper ends affixed in bar 139 of slide 75 and extend down from bar 139 through holes such as indicated at 145 in the crossbar 125 of slide 73 and through holes such as indicated at 147 in crossbar 57 of the carriage 49, being slidable in these holes. Pins 85e and 85f have their upper ends fixed in slide block 143 of slide 75 and extend down from slide block 143 through holes such as indicated at 149 in slide block 129 of slide 73 (see FIG. 12) and through holes such as indicated at 151 in slide block 95 of the carriage, being slidable in these holes.

Figure 14:
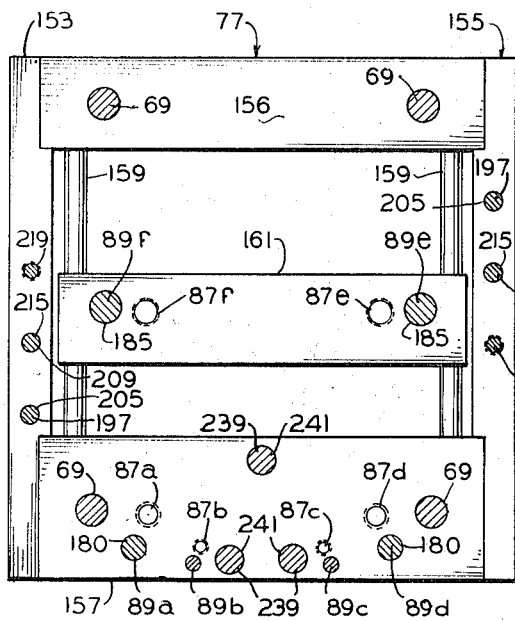
Figure 15:
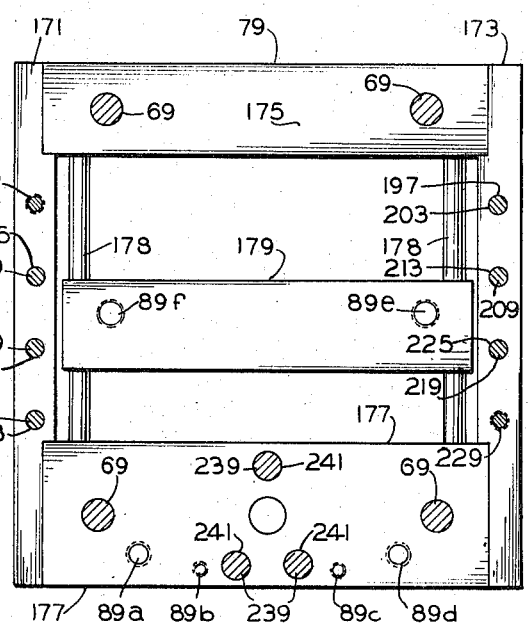

The slide 77 for the fourth set of coil pins is similarly in the form of an open rectangular frame having side bars 153 and 155 and crossbars 156 and 157 with a pair of parallel guide rods 159 extending between the crossbars (see FIG. 14). A slide block 161 is slidable on rods 159 toward and away from crossbar 157. Pins 87a–87d of the fourth set of pins have their upper ends fixed in bar 157 of slide 77 and extend down from bar 57 through holes 159 in the crossbar 139 of slide 75, holes 161 in the crossbar 125 of slide 73 and holes 163 in crossbar 57 of the carriage, being slidable in these holes. Pins 87e and 87f have their upper ends fixed in slide block 161 of slide 77 and extend down from slide block 161 through holes 165 in slide block 143 of slide 75, holes 167 in slide block 129 of slide 73 and holes 169 in slide block 95 of the carriage, being slidable in these holes.

The fifth coil pin slide 79 is similarly in the form of an open rectangular frame having side bars 171 and 173 and crossbars 175 and 177 with a pair of parallel guide rods 178 extending between the cross bars. A slide block 179 is slidable on rods 178 toward and away from crossbar 177. Pins 89a–89d of the fifth set of pins have their upper ends fixed in bar 177 of slide 79 and extend down from bar 177 through holes 180 in the crossbar 157 of the slide 77, holes 181 in the crossbar 139 of slide 75, holes 182 in the crossbar 125 of slide 73 and holes 183 in crossbar 57 of the carriage, being slidable in these holes. Pins 89e and 89f have their upper ends fixed in slide block 179 of slide 79 and extend down from slide block 179 through holes 185 in slide block 161 of slide 77, holes 187 in slide block 143 of slide 75, holes 189 in slide block 129 of slide 73 and holes 191 in slide block 95 of the carriage, being slidable in these holes.

The slide 73 is adapted to be moved up and down on rods 69 by a pair of air cylinders 193 mounted on plate 71 and extending upward therefrom, the pair of cylinders being under control of a suitable conventional valve means for simultaneous action. For this purpose, piston rods 197 extend down from pistons 199 in these cylinders through holes 201 in plate 71, holes 203 in the side bars 173 and 171 of slide 79, holes 205 in the side bars 153 and 155 of slide 77, and holes 206 in the side bars 133 and 135 of slide 75. Slide 73 is attached to the lower ends of these rods.

The slide 75 is adapted to be moved up and down on rods 69 by a pair of air cylinders 207 mounted on plate 71 and extending upward therefrom, the pair of cylinders being under control of a suitable conventional valve means for simultaneous action. For this purpose, piston rods 209 extend down from pistons 211 in these cylinders through holes 212 in plate 71, holes 213 in the side bars 173 and 171 of slide 79 and holes 215 in the side bars 153 and 155 of slide 77. Slide 75 is attached to the lower end of these rods.

The slide 77 is adapted to be moved up and down on rods 69 by a pair of air cylinders 217 mounted on plate 71 and extending upward therefrom, the pair of cylinders being under control of a suitable conventional valve means for simultaneous action. For this purpose, piston rods 219 extend down from pistons 221 in these cylinders through holes 223 in plate 71, and holes 225 in the side bars 173 and 171 of slide 79. Slide 77 is attached to the lower ends of these rods.

The slide 79 is adapted to be moved up and down on rods 69 by a pair of air cylinders 227 mounted on plate 71 and extending upward therefrom, the pair of cylinders being under control of a suitable conventional valve means for simultaneous action. For this purpose, piston rods 229 extend down from pistons 231 in these cylinders through holes 233 in plate 71. Slide 79 is attached to the lower ends of these rods.

The four slides 73, 75, 77 and 79 are adapted to be moved by their respective pairs of cylinders 193, 207, 217 and 227 between the raised retracted position on rods 69 in which they appear in FIGS. 9 and 11, and a lowered extended position on rods 69 in which slide 73 is in engagement with the top of the carriage 49, slide 75 is in engagement with the top of slide 73, slide 77 is in engagement with the top of slide 75 and slide 79 is in engagement with the top of slide 77. The raised retracted position of the slides is determined by engagement of the uppermost slide 79 with a plate 235 engageable with the bottom of plate 71 and by engagement of slide 77 with 79, 75 with 77 and 73 with 75. When the slides are raised, pins 83a–83f, 85a–85f, 87a–87f and 89a–89f are withdrawn completely into their respective holes in bar 57 and slide block 95 of the carriage 49, so that pins 81a–81f (which are fixed with respect to the carriage) are unsurrounded for winding of the first coil C1 thereon. After this first coil has been wound, cylinders 193 are actuated to drive the slide 73 downward and hence to drive the pins 83a–83f downward to a winding position projecting down from carriage 49 surrounding pins 81a–81f for winding the second coil C2 around pins 83a–83f (the first coil C1 remaining on pins 81a–81f). After the second coil has been wound, cylinders 207 are actuated to drive slide 75 downward and hence to drive pins 85a–85f downward to a winding position projecting down from carriage 49 surrounding pins 83a–83f for winding the third coil C3 around pins 85a–85f, the second and first coils remaining on their respective pins.

After the third coil has been wound, cylinders 217 are actuated to drive slide 77 downward and hence to drive pins 87a–87f downward to a winding position projecting down from carriage 49 surrounding pins 85a–85f for winding the fourth coil C4 around pins 87a–87f, the third, second and first coils remaining on their respective pins. After the fourth coil has been wound, cylinders 227 are actuated to drive slide 79 downward and hence to drive pins 89a–89f downward to a winding position projecting down from carriage 49 surrounding pins 87a–87f for winding the fifth coil C5 around pins 89a–89f, the fourth, third, second and first coils remaining on their respective pins.

An ejector or stripper 237 is provided for ejecting or stripping the coils from the pins (after collapse of the coil form, i.e., after movement of pins 81e and 81f, 83e and 83f, 85e and 85f, 87e and 87f and 89e and 89f to their collapsed coil-ejecting position). This stripper comprises a plate located underneath the bar 57 of the carriage 49 mounted on the lower end of three rods 239 extending down from the aforesaid plate 235. These rods 239 extend through holes 241 in the bars 177, 157, 139, 125 and 57 of slides 79, 77, 75 and 73 and the carriage 49. The plate 235 is secured to the lower end of a piston rod 243 extending down through a hole 245 in plate 71 from a piston 247 in a stripper cylinder 249 mounted on plate 71 extending upward therefrom, this cylinder being under control of a suitable conventional valve means. The stripper 237 has holes such as indicated at 251 (see FIG. 7) for pins 81a–81d, 83a–83d, 85a–85d, 87a–87d and 89a–89d, and a series of holes such as indicated at 253 for receiving certain fingers (to be described) on the upper coil placing units 5A, 5B.

Referring more particularly to FIGS. 16–18, the winding assembly at the winding station is shown to comprise a carriage 255 mounted for horizontal sliding movement on a pair of guide rods 257 between a first position for winding on a first coil form at the winding station and a second position for winding on the second coil form at the winding station. These rods 257 extend between supports 259 mounted on the frame 35 of the machine. The carriage 255 comprises a base plate 261 having ball bearing guides 263 at its four corners receiving the rods 257. An internally splined quill 265 confined in a housing 267 is journalled for rotation on a vertical axis at the center of the base plate 261 by means of a ball thrust bearing 269. An externally splined tubular shaft 271 extends vertically through the quill, being rotatable therewith and axially vertically slidable therein. The flyer 19 comprises a hub 273 which is secured on the upper end of this shaft, a tubular arm 275 extending laterally outward and angled upward from the hub, and a balance arm 277 opposite the arm 275. A plastic hub 279 extends upward through the shaft 271 from its lower end and through the tubular flyer arm 275 for guiding wire from a supply (not shown) up through the shaft 271 and arm 275 and thence around a guide roller 281 at the upper end of arm 275 for winding on a coil form. The quill housing 267 has a spur gear 283 secured thereto. A hydraulic motor 285 carried by the carriage base plate 261 underneath the latter has its shaft 287 extending upward through an opening in plate 261 and carrying a gear 289 in mesh with gear 283 for driving the quill 265 and the flyer shaft 271. Gear 283 is in mesh with a gear 291 located opposite gear 289, this gear 291 being on the upper end of a shaft 293 journalled in bearings 295 in an opening in plate 261. Shaft 293 has a disk 299 on its lower end having a hole 301 therein, this disk acting in conjunction with a photocell pickup 303 for counting the revolutions of the flyer shaft so as to control the number of turns in each coil wound on a coil form. Motor 285 is under control of suitable conventional valve means for starting and stopping it, and accelerating and decelerating it.

A hydraulic cylinder 305 is provided for traversing the carriage 255 between its stated first and second positions. This cylinder, operation of which is controlled by suitable conventional valve means, is mounted in horizontal position parallel to the guide rods 257 and below one of the guide rods. A piston rod 307 extends from a piston (not shown) in the cylinder through the inner end head of the cylinder to a connection at 311 with the carriage.

Means is provided for traversing the flyer 19 for level winding of the wire on a coil form. As shown, this means comprises a hydraulic traverse cylinder 313 mounted in vertical position on a bracket 315 which extends down from the carriage base plate 261. A piston rod 319 is secured to the piston (not shown) in cylinder 313 and extends upward through the upper end head of the cylinder and downward through the lower end head of the cylinder. A yoke generally designated 321 is secured to the upper end of the piston rod. This yoke comprises a block having arms 325 spaced apart to straddle the cylinder and a bridge 327 spanning these arms, the piston rod extending upward between the arms and having its upper end connected to the center of the bridge as indicated at 329. The yoke is guided for vertical movement by means of guide rods 331 extending vertically from arms 325 of the yoke on opposite sides of the cylinder 313 through guides 333 mounted on the inside of bracket 315. The lower end of the flyer shaft 271 is received in a bearing 335 in the yoke, the arrangement being such that, on upward and downward movement of the piston rod 319 and the yoke, the flyer shaft is traversed up and down.

Means is provided for adjusting the stroke of the flyer shaft. As shown, this comprises a rod 337 mounted for vertical sliding movement on the outside of bracket 317 in guides 339. This rod is connected to the lower end of the piston rod 319 as indicated at 341 for reciprocation with the piston rod. Adjustably mounted on the rod 337 are two collars 343 and 345, one above the other. On upward movement of the piston rod 319 and the rod 337, the upper collar is adapted to trip an upper limit switch 347 mounted on the bracket for actuating a conventional solenoid valve means for cylinder 313 reversing the action of cylinder 313 to drive the flyer shaft down. On downward movement of the piston rod 319 and the rod 337, the lower collar is adapted to trip a lower limit switch 349 to reverse the action of cylinder 313 to drive the flyer shaft up. The stroke of the flyer shaft may be varied by adjustment of the collars on rod 337.

The index table 3 (which carries the upper coil placing units 5A and 5B) comprises a flat circular plate mounted on the upper end of a tubular hub 351 journalled for rotation on a vertical axis in a cylindric mount 353 on the frame 35 of the machine by means of a ball thrust bearing 355 and roller bearings 357 (see FIG. 22). The index table 3 is spaced to some extent above the top of the frame 35. The table is adapted to be rotated for indexing by means of a hydraulic motor 359 mounted on frame 35 having a gear 361 on its shaft 363 in mesh with a gear 365 secured to the bottom of the table. The hydraulic motor 359 is under control of a valve 367 which in turn is controlled by a cam 369 on the lower end of the hub for providing for appropriate acceleration of the table at the start of an indexing operation and appropriate deceleration at the termination of an indexing operation. A nut 371 threaded on the lower end of the hub holds the parts, including the cam, in assembly.

As above noted, the index table 3 is rotatable in 180° steps to index one of the placer heads 5A, 5B from the coil transfer station 7 to the coil-placing station 9, and to bring the other placer head back from the coil-placing station 9 to the coil transfer station 7. The index table has two recesses 373A and 373B in its bottom spaced at 180° intervals (and in the diametrical plane at right angles to the diametrical plane of units 5A and 5B, and two detents such as indicated at 375, each actuated by a hydraulic cylinder 377 (see FIG. 23) mounted on the frame 35 of the machine engageable in these recesses for latching the index table in its indexed positions. Suitable conventional valve means is provided for controlling the detent cylinders 377.

Each of the placer heads 5A and 5B comprises a set of fingers 379 and wedge guide members 381 (similar to the fingers and wedge guide members denoted 13 and 15 in U.S. Pat. No. 3,324,536) arranged in a circle with spaces therebetween extending upward from between a fluted finger holder 383 and a surrounding collar 385 (see FIGS. 8 and 19). The finger holder 383 is of tubular cylindric form with flutes 387 extending lengthwise thereof (vertically) in its outer cylindric periphery. The fingers 379 extend lengthwise in the flutes and project upward from between the finger holder 383 and the collar 385, the lower ends of the fingers engaging a head 389 on the lower end of the finger holder. The fingers are arranged with their outer faces on a circle having a diameter corresponding to the diameter of the stator bore B for a sliding fit of the stator S on the fingers. The number of fingers corresponds to the number of the radial partitions R of the stator, and the stator is adapted to be applied to the fingers with partitions R registering with the fingers on the outside thereof, as illustrated in FIG. 6. The wedge guide members 381 have their inner sides seated in longitudinal grooves 391 in the outside of fingers 379 and project upward from between the finger holder and the collar on the outside of the fingers, terminating short of the upper ends of the fingers. Set screws 393 and 395 threaded in tapped holes in the collar have their inner ends engaging the wedge guide members to clamp the latter and the fingers in place. The collar 385 has an outwardly extending flange 397 adjacent its lower end. The index table 3 has two shouldered openings 399 spaced at 180° intervals therearound (in a diametrical plane at right angles to the diametrical plane of the recesses 373A and 373B). Each of the assemblies 5A and 5B has the lower end of its collar 385 received in a respective opening 399 with flange 397 bearing on the shoulder 401 in the opening and secured to the table as by means of screw 403.

A stripper 405 for driving coils placed on fingers 379 into the slots of a stator is axially (vertically) slidable within the array of fingers 379 above the finger holder 383. This stripper comprises a body 407 in the form of a ring having an axially fluted periphery for a sliding fit with fingers 379,, the fluting providing an annular array of radially extending ribs 409 which lie between the fingers 379. The upper end of the body 407 is made conical. The opening in the ring-shaped body 407 is stepped so as to have an upper portion 411 of relatively large diameter, an intermediate portion 413 of intermediate diameter and a lower portion 415 of smaller diameter than the intermediate portion, providing an upwardly facing shoulder 417 at the juncture of portions 413 and 415. A conical nose 419 has its lower end threaded in the upper portion 411 of the opening in the body 407, and has a tapered tip 421. Secured to the bottom of the nose, and extending downward therefrom to the bottom of the opening in body 407, is an inverted cup member 423 constituting a ball cage. The external diameter of this cage is less than the diameter of the lower portion 415 of the opening in the body 407. A sleeve 425 surrounds the cage within the opening in body 407. This sleeve has an internal annular groove 427 and an external flange 429. The cage has tapered holes 431 extending radially in its downwardly extending cylindric wall. Detent balls 433 are pocketed in these holes by the sleeve 425. A coil compression spring 435 reacts downward from the nose 419 against the flange 429 on the sleeve to bias the sleeve downward to an extended position, determined by the engagement of the flange with shoulder 417, wherein the lower end of the sleeve projects downward beyond the bottom of the body 407 and the lower end of the cage. In this extended position of the sleeve, the groove 427 is below the balls 433, and the latter projects inward from the inner ends of the tapered holes 431 into the space within the cage 423. The sleeve is slidable upward relative to the cage and the body 407 against the return bias of spring 435 to a position wherein groove 427 is at the level of the balls 433, for entry of the balls into the groove, for a purpose that will appear.

Each time one or the other of the upper coil placing finger assemblies 5A or 5B is indexed to the coil placing station 9 (and latched therein by the detents 375), a stator S is placed on the upper ends of fingers 379 (above the upper ends of the wedge guide members 381) of that coil-placing finger assembly, and means is povided for clamping the stator on the upper ends of the fingers to prevent it from moving upward during the ensuing placement of coils in the slots of the stator. This clamping means (see FIGS. 1-3, 8 and 22) comprises a clamp assembly generally designated 437 on the upper end of a vertically movable clamp lifting and lowering rod 439 actuated by a hydraulic cylinder 441 having a suitable conventional control valve means. The latter is mounted in vertical position on the base 443 of the frame 35 of the machine on the axis of the index table 3. A piston rod 445 extends up through the upper end of the cylinder and has a connection 447 at its upper end with the lower end of the clamp rod 439. The latter extends up through an opening 449 in a part 451 of frame 35, and through the hub 351 of the index table 3, and projects upward out of an upper index table hub section 453. The clamp rod is vertically shidable in hub 351 and the upper hub section, and has longitudinal slots 455 receiving guide rollers 457 carried by a plate 459 secured to frame part 451. These rollers prevent rotation of the clamp rod, while permitting it to move up and down.

The clamp assembly 437 on the upper end of the clamp rod 439 comprises a base plate 461 having a hole and a collar 463 extending upward therefrom in line with the hole for receiving the rod 439. The base plate and collar are split as indicated at 463, and are clamped on the upper end of rod 439 by a clamp screw 465 with the base plate extending above the index table toward the coil placing station 9. Extending out from the upper end of the collar above the base plate 461 is an upper plate 467. Pivot pins 469 extend vertically between plates 461 and 467 at each of the two corners thereof toward the placing station. Pivoted on each pin for swinging movement in a horizontal plane about the axis of the pin is a clamp arm 471. Each arm is adapted to be swung between a position for clamping a stator and a retracted position clear of the stator by an air cylinder 473, a suitable conventional valve means being provided for controlling these clamp-actuating cylinders 473. FIG. 8 shows the clamp arms in retracted position diverging away from one another, and cylinders 473 are adapted to swing them toward one another into a clamping position above a stator on the placer head at the placing station.

At the coil-placing station 9, the machine frame 35 supports a horizontal table plate 475, provided with a circular opening 477 (see FIG. 19). Each of the coil-placing finger assemblies 5A and 5B, when indexed to the coil-placing station, registers with this opening (i.e., the vertical axis of the coil placing finger assembly is brought into register with the vertical axis of opening 477). The bottom of the index table 3 is spaced slightly above the top surface of plate 475, so that it may rotate above plate 475 with minimum clearance. Two vertical spacer rods 479 extend between a bottom plate 442 which rests on the machine frame 443 and the plate 475. A carriage 481 is guided for vertical movement, up and down, by means of a pair of vertical ball screw shafts 483 driven by a reversible hydraulic motor 485 (see FIG. 3) via a gear train 487, the carriage having ball screw nuts 489 in threaded engagement with the screw shafts. The latter have their upper ends journalled in vertical bearings 491 which are mounted below plate 475 and their lower ends journalled in bearings 493 in openings 495 in bottom plate 442. Suitable conventional reversing valve means is provided for controlling motor 485. The gear train 487 comprises a center gear 497 journalled on a vertical stub shaft 499 extending up from the bottom plate 442, gears 501 on the screw shafts adjacent their lower ends in mesh with the center gear, and a drive gear 503 on the shaft of motor 485 in mesh with the center gear.

A tubular guide 505 has its upper end mounted in opening 477 in plate 475 and extends downward therefrom. Mounted on the lower end of this guide is a horizontal plate 507. The latter has holes 509 for the screw shafts 483. The upper screw shaft bearings 491 extend up from plate 507 toward the plate 475, being attached to plate 507 by screws as indicated at 511. Surrounding the guide 505, and extending vertically between plates 507 and 475, is a cylindric wedge magazine 513 formed around its periphery with a series of longitudinal slots 515 for receiving and holding wedges M. The wedge magazine is rotatable around the tubular guide 505. At its upper end it carries a ring 517 having a circular series of recesses 519 in the top thereof for entry of a spring-loaded detent ball 521 for latching the magazine in various loading positions for insertion in the slots 515 of wedges formed by a wedge forming and loading mechanism indicated in phantom at 522 in FIG. 2. This mechanism forms no part of the present invention and hence is not further described herein.

The plate 507 has a circular array of wedge push rod openings 523 and plate 475 has a corresponding circular array of wedge push rod openings 524 with which the slots 515 of the magazine 513 are held in accurate alignment by engagement of the detent ball 521 in any one of recesses 519. A circular series of wedge push rod 527 extends up from the carriage 481 and is adapted for vertical passage upward through openings 523, slots 515 and openings 525 on upward movement of the carriage. The latter normally occupies a retracted lower position wherein the upper ends of the wedge push rods 527 are in openings 523, below the magazine 513, so that the latter is free to be rotated for loading the slots 515 with wedges (see FIG. 19). Also extending up from the carriage and slidable upward and downward in the tubular guide 505 is an actuating rod 529 for the stripper 405. When the carriage is in its lowered retracted position, the upper end of rod 529 is in the lower end of the guide 505. When the carriage moves up, the rod 529 passes upward through the guide. On the upper end of the rod 529 is a reduced-diameter extension 531 having an annular peripheral groove 533.

A cycle of operation of the apparatus may be regarded as starting with the winding of a first pole winding P1 on one of the coil forms at the winding station 17, followed by the winding of a second pole winding P2 on the other coil form at the winding station, indexing of the winding head or turret 15 to bring the two prewound pole windings P1 and P2 to the transfer station 7, transfer of the two prewound pole windings P1 and P2 to the placer head at the transfer station, indexing of the placer head 3 to bring that placer head to the placing station 9, and the placing of the two pole windings in the slots A of a stator S applied to the placer head at the placing station.

As shown in FIGS. 2 and 8, the turret 15 occupies its position in which coil forms F1 and F2 are at the winding station 17 and coil forms F3 and F4 are at the transfer station 7, and the placer head table 3 occupies its position in which placer head 5A is at the transfer station and the other placer head 5B is at the placing station.

The carriage 255 of the winding assembly is in its stated first position (toward the left as viewed in FIG. 4) for the winding of the first pole winding P1 on the pins of coil form F1. The carriage 49 of coil form F1 is down in its winding position, and slides 73, 75, 77 and 79 of coil form F1 are in their raised retracted position so that pins 81a–81f of coil form F1 are unsurrounded for winding thereon of the first coil C1 (the smallest coil) of the first pole winding P1. Slide blocks 95, 129, 143, 161 and 179 of the carriage 49 of the four slides 73, 75, 77 and 79 are all in their expanded winding position, wherein pins 81e and 81f, 83e and 83f, 85e and 85f, 87e and 87f and 89e and 89f are all in expanded position with respect to pins 81a–d, 83a–d, 85a–d, 87a–d, and 89a–d for the winding of the coils. The carriage 49 of coil form F2 is in its raised retracted position (having been previously so moved by the carriage-actuating cylinders 63 for coil form F2), so that all the pins of coil form F2 are above and clear of flyer 19 to enable the latter to proceed to wind the first pole winding P1 on the pins 81a–f of coil form F1.

Wire W extends from a conventional wire supply, e.g., a supply of coils of wire in a wire supply container, upward through the flyer shaft 271 and flyer arm 275 (which are tubular for this purpose) and thence around flyer guide roller 281 at the end of arm 275, extending generally horizontally from roller 281 to pins 81a–f of coil form F1, and has its end suitably gripped to these pins. Flyer motor 285 is set into operation to drive the flyer 19 via gears 289 and 283, and flyer traverse cylinder 313 is set into operation to traverse the flyer for level winding of the wire into coil C1 of the first pole winding P1 on pins 81a–f of coil form F1. Limit switches 347 and 349 control the valve means for the traverse cylinder in conventional manner and are actuated by rollers 343 and 345 on rod 337 to determine the stroke of the flyer. As noted above, collars 343 and 345 are adjustable on rod 337 to vary the stroke of the flyer, as desired. It may be mentioned that the flyer 19 may be traversed only through a single stroke during the winding of coil C1 for level winding of the coil in single turns. The revolution counter disk 299 is driven off gear 283 in a one-to-one ratio with flyer 19 by gear 293, and acts in conjunction with photocell pickup 303 to count the number of revolutions of the flyer for determining the number of turns in coil C1, so that the flyer motor 285 may be stopped or decelerated on completion of the winding of coil C1 with the desired number of turns.

On completion of winding of coil C1 on pins 81a–f of coil form F1, cylinders 193 of this coil form are actuated to drive down the first slide 73 and thus drive down the second set of pins 83a–f of coil form F1 to their winding position extending down from carriage 49 defining a winding configuration surrounding pins 81a–f for winding the second coil C2 of pole winding P1 on pins 83a–f. The flyer 19 then operates to wind coil C2 on pins 83a–f without severance of the wire W.

On completion of winding of coil C2 on pins 83a–f of coil form F1, cylinders 207 of this coil form are actuated to drive down the second slide 75 and thus drive down the third set of pins 85a–f of coil form F1 to their winding position extending down from carriage 49 defining a winding configuration surrounding pins 83a–f for winding the third coil C3 of pole winding P1 on pins 85a–f. The flyer 19 then operates to wind coil C3 on pins 85a–f without severance of the wire W.

On completion of winding of coil C3 on pins 85a–f of coil form F1, cylinders 217 of this coil form are actuated to drive down the third slide 77 and thus drive down the fourth set of pins 87a–f of coil form F1 to their winding position extending down from carriage 49 defining a winding configuration surrounding pins 85a–f for winding the fourth coil C4 of pole winding P1 on pins 87a–f. The flyer 19 then operates to wind coil C4 on pins 87a–f without severance of the wire W.

On completion of winding of coil C4 on pins 87a–f of coil form F1, cylinders 227 of this coil form are actuated to drive down the fourth slide 79 and thus drive down the fifth set of pins 89a–f of coil form F1 to their winding position extending down from carriage 49 defining a winding configuration surrounding pins 87a–f for winding the fifth coil C5 of pole winding P1 on pins 89a–f. The flyer 19 then operates to wind coil C5 on pins 89a–f without severance of the wire W.

After the completion of winding coil C5 on pins 89a–f of coil form F1 (i.e., after completion of winding of the pole winding P1 on coil form F1, the carriage 49 of coil form F1 is raised by means of the respective cylinder 63 to its raised retracted position. Pins 83a–f, 85a–f, 87a–f and 89a–f of coil form F1 (carrying coils C2–C5) remain in their downwardly extending position with respect to the carriage 49, surrounding pins 81a–f (carrying coil C1), but the retraction of carriage 49 raises all these pins and coils C1–C5 thereon above the path of the flyer. The carriage 49 of coil form F2 is then moved downward by the respective cylinders 63 to its winding position, bringing pins 81a–f of coil form F2 down to winding position, and the carriage 255 of the winding assembly is shifted by means of cylinder 305 to its second position (i.e., shifted toward the right as viewed in FIG. 4) for winding of coils by the flyer 19 on the pins of coil form C2. While pins 83a–f, 85a–f, 87a–f and 89a–f of coil form C2 move down with carriage 49, they remain in their raised retracted position relative to the carriage 63 so that pins 81a–f of coil form F2 are unsurrounded for the winding thereon of the first coil C1 of the second pole winding P2. Winding of coils C1–C5 of pole winding P2 then proceeds on the pins of coil form F2 in the same manner as described for the winding of coils C1–C5 of pole winding P2 on the pins of coil form F1.

On completion of winding pole winding P2, carriage 49 of coil form F2 is raised by means of the respective cylinders 63 to its raised retracted position. Pins 83a–f, 85a–f, 87a–f and 89a–f of coil form F2 (carrying coils C2–C5 of pole winding P2) remain in their downwardly extending position with respect to carriage 49 of coil form F2, surrounding pins 81a–f (carrying coil C1 of pole winding P2), but the retraction of carriage 49 of coil form F2 raises all these pins and the coils thereon clear of the flyer. The winding of pole winding P2 is effected without severance of the wire, so that the wire is continuous as between pole windings P1 and P2.

Having completed the winding of pole windings P1 and P2 on coil forms F1 and F2 at the winding station 17 and the retraction of the coil forms, as above described, the detent cylinder 45 is actuated to withdraw the detent 43 from the socket 47 in which it is entered, and the winding head index motor 40 is set into operation to index the winding head or turret 15 through 180° in clockwise direction as viewed from above, the turret 15 bqcoming latched in its indexed position by detent 43. This brings the coil forms F1 and F2 carrying pole windings P1 and P2 on their pins to the transfer station 7 (i.e., to the position formerly occupied by coil forms F3 and F4) with the pins and pole windings in raised retracted position. Concomitantly, coil forms F3 and F4 (which had been at the transfer station 7) are indexed 180° to the winding station. At this time, the carriage 49 and slides 73, 75, 77 and 79 of each of coil forms F3 and F4 are in their raised retracted position. After the indexing operation has been completed, the cylinders 63 of coil form F3 (now at the winding station) are actuated to drive the carriage 49 of coil form F3 down to its winding position, while slides 73, 75, 77 and 79 remain in their raised retracted position relative to carriage 49. Carriage 49 of coil form F4 remains in its raised retracted position.

It will be observed that on the clockwise indexing of the turret 15, coil form F3 comes into position at the right as viewed in FIG. 4, and that the flyer 19, having been previously shifted to its second winding position at the right as viewed in FIG. 4, is in position for winding of a first pole winding P1 on the pins of coil form F3. The wire is gripped to the pins 81a–f of coil form F3 and cut between coil forms F2 and F3, and winding of a first pole winding P1 then proceeds on the pins of coil form F3 in essentially the same manner as previously described in regard to the winding of the pole winding P1 on the pins of coil form F1. After completion of the winding of pole winding P1 on the pins of coil form F3, the carriage 49 of coil form F3 is raised by the respective cylinders 63 to its retracted position, the carriage 49 of foil form F4 is moved downward by its cylinder 63 to its winding position, and the flyer 19 is shifted back to the left to its first position for the winding of a second pole winding P2 on the pins of coil form F4.

While the winding of two pole windings P1 and P2 proceeds on coil forms F3 and F4 at the winding station 17, the two pole windings P1 and P2 on coil forms F1 and F2 now at the transfer station are transferred to the placer head 5A which is at the transfer station, after which the placer head table 3 is indexed 180° to bring placer head 5A to the placing station 9, and the two pole windings on placer head 5A are placed in the slots of a stator S applied to placer head 5A at the placing station.

The transfer of the pole windings P1 and P2 from coil forms F1 and F2 to placer head 5A at the transfer station is effected by first actuating the cylinders 63 of coil forms F1 and F2 to move the carriages 49 of both these coil forms downward. As previously noted, the pins 83a–f, 85a–f, 87a–f and 89a–f of both these coil forms are at this time in their downwardly extended position with respect to the carriages 49 (carrying coils C2–C5) and pins 81a–f of both of these coil forms (carrying coils C1) are in position extending downward within the pin array. The carriages 49 move downward to the point where the lower ends of fingers 81a and 81d, 83a and 83d, 85a and 85d, 87a and 87d and 89a and 89d of the two coil forms F1 and F2 lie on the outside of correlated fingers 379 of the placer head 5A, so that the side portions of coils C1–C5 which extend between pins 81a and 81b, 81c and 81d, 83a and 83b, 83c and 83d, 85a and 85b, 85c and 85d, 87a and 87b, 87c and 87d, 89a and 89b, and 89c and 89d are aligned with the spaces between fingers 379 for subsequent entry into these spaces. Pins 81b and 81c, 83b and 83c, 85b and 85c, 87b and 87c and 89b and 89c enter the placer head 5A on the inside of the related fingers 379. The collapse cylinders 97 of coil forms F1 and F2 are then actuated to drive the slide blocks 95 of carriages 49 of both of these coil forms toward the bars 57 of the carriages, resulting in movement of pins 81e and 81f, 83e and 83f, 85e and 85f, 87e and 87f and 89e and 89f of each coil form toward the other pins for collapse of the coil forms to enable the pole windings P1 and P2 to be stripped therefrom. Then, stripper cylinders 249 of both the coil forms F1 and F2 are actuated to drive the strippers 237 of the coil forms downward on the pins, thereby to push the pole windings P1 and P2 down off the pins and transfer them to the placer head 5A. The strippers 237 move downward on fingers 379 to effect the transfer, the fingers 379 being received with a sliding fit in holes 253 in the strippers for this purpose. The pole windings P1 and P2 are thus transferred to the placer head 5A with the coils C1–C5 of the two pole windings in the same relation as that in which they were wound on the pins of coil forms F1 and F2, as appears in FIG. 7. Side portions of the coils of the two pole windings are received in the spaces between fingers 379 of the placer head 5A, similar to the disposition of the pole windings relative to the holes 253 appearing in FIG. 7, noting that the fingers 379 are arranged in the same pattern as the holes 253.

Following the transfer of the pole windings P1 and P2 from coil forms F1 and F2 to the fingers 379 of the placer head 5A at the transfer staion 7, the stripper cylinders 249 of these coil forms are actuated to retract the strippers 237. Cylinders 63 of coil forms F1 and F2 are actuated to raise the carriages 49 of these coil forms to their retracted position, cylinders 97 are actuated to move slide blocks 95 of the carriages away from carriage bars 57 to move the e and f pins back to their expanded winding position, and cylinders 193, 207, 217 and 227 are actuated to retract the slides 73, 75, 77 and 79. This raises the pins of the coil forms F1 and F2 from the placer head 5A to enable the placer head table 3 to index.

Cylinders 377 are then actuated to retract the detents 375 for the table 3. Motor 359 is actuated to index the table through 180° to bring placer head 5A to the placing station 9 and move placer head 5B to the transfer station. Cylinders 377 are then actuated to return the detents 375 to their table-latching position. At the placing station, the tubular finger holder 383 is axially aligned with the tubular guide 505 for the stripper rod 529 (which at this time is in lowered retracted position wherein its upper end is in the lower end of the guide 505 as appears in FIG. 19). A stator S is applied to the upper ends of fingers 379. Cylinders 473 are actuated to swing the stator clamps 471 toward on another from their FIG. 8 retracted position to a stator clamping position above the stator, and cylinder 441 is actuated to pull down the rod 439 to clamp the stator on the fingers. The motor 485 is then actuated to rotate the screw shafts 483 to drive the carraige 481 upward, thereby driving the rod 529 and the wedge push rods 527 upward. The wedge push rods 527 act to push bore wedges M from the wedge magazine 513 into the stator slots. The rod 529 moves upward in the bore of finger holder 383, its upper end extension 531 enters the ball cage 423 of the stripper 405 and, continuing its upward movement, pushes the stripper 405 upward. As the stripper 405 moves upward, it pushes the coils of the pole windings P1 and P2 from the fingers 379 into the slots of the stator. Also, as the stripper moves upward away from the upper end of the tubular finger holder 383, the sleeve 425 is biased downward by spring 435 to force the balls 433 into the annular peripheral groove 533 in the extension 531 of rod 529 to establish a connection between the rod 529 and the stripper (see FIG. 20). The motor 485 is then reversed to rotate the screw shafts 483 to drive the carriage 481 downward, thereby pulling the rod 529 and the wedge push rods 527 downward. Since a connection has been established by the balls 553 between the rods 529 and the stripper 405, the stripper is pulled downward by the rod to its lowered retracted position of FIG. 19. When the lower end of sleeve 425 engages the upper end of the tubular finger holder 383, the stripper moves downward relative to the sleeve to the point where the groove 427 in the sleeve is at the level of the balls 533. This enables entry of the balls into the groove 427 for disconnection of the upper end 531 of rod 529 from the stripper (see FIG. 21), and the rod completes its downward movement, leaving the stripper in its lowered retracted position of FIG. 19 on the upper end of finger holder 383. The withdrawal of the rod 529 from the placer head at the placing station enables indexing of the table 3.

Having placed the two pole windings P1 and P2 which were on the placer head 5A at the placing station 9 in the stator S applied to placer head 5A as above described, cylinder 441 is actuated to raise the clamps 471 and cylinders 473 are actuated to retract the clamps. The stator, with the pole windings P1 and P2 (and the bore wedges M) in its slots, is then removed from the placer head 5A, completing the cycle.

On the next cycle, the turret 15, having two pole windings wound on coil forms F3 and F4, is indexed 180° in counterclockwise direction, bringing coil forms F3 and F4 to their position at the transfer station 7 as shown in FIGS. 2 and 8, and returning coil forms F1 and F2 to the winding station. The two pole windings are transferred to placer head 5B now at the transfer station, and then table 3 is indexed to bring placer head 5B to the placing station 9 for placing the two pole windings in the slots of a stator applied to head 5B at the placing station. Then, the cycle is repeated in respect to transfer of two pole windings from coil forms F1 and F2 to head 5A and indexing of table 3 for placement of the windings from head 5A in the slots of a stator, as previously described. Thus, the apparatus functions on successive cycles to effect transfer of coils from one pair of coil forms and then from the other pair for placement, and, during the interval while coils are transferred to the placer head at the transfer station 7 and coils are placed at the placing station 9, coils may be wound at the winding station 17, enabling a high production rate of stator/coil assemblies. It will be observed that, on each cycle, two pole windings P1 and P2 are wound successively on two adjacent coil forms (F1 and F2 or F3 and F4) by the single flyer 19, and two pole windings P1 and P2 are simultaneously placed in the slots of a stator. Also, coils of different size may be wound simply by turning the screw member 105a to adjust the expanded position of the e and f pins relative to the a and d pins of the coil forms.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for winding and placing coils in the slots of a stator comprising an indexing conveyor, a plurality of placer heads carried by the conveyor at spaced intervals thereon, each placer head being adapted to hold coils for placement in the slots of a stator applied to the head, means for winding coils and transferring them to a placer head, means for indexing the conveyor to bring a placer head carrying coils to a placing station, and means at the placing station for pushing the coils from the placer head at the placing station into the slots of a stator applied to that placer head, said conveyor comprising a rotary index table, said placer heads extending upward from the table and being spaced at equal intervals around the table, said table being rotatable in steps corresponding to said intervals to index the placer heads from a transfer station, at which coils are transferred to a placer head, to the placing station, and to index the placer heads from the placing station back to the transfer station, each placer head comprising a set of fingers arranged in a circle with spacers between the fingers for receiving side portions of the coils, said coil pushing means comprising a stripper axially slidable within the set of fingers, and means for driving the stripper, wherein each set of fingers has its own stripper axially slidable therein, and wherein there is a single stripper driving means at the placing station for driving the stripper of the set of fingers at the placing station.

2. Apparatus as set forth in claim 1 wherein the stripper-driving means comprises a vertically reciprocable rod movable upward from a retracted position at the placing station below the table upward into the set of fingers at the placing station for driving the stripper of that set upward from a lowered retracted position in said set, and then movable downward, and means for connecting the rod to the stripper for pulling the stripper back downward to its retracted position when the rod moves downward and disconnecting the rod from the stripper when the stripper reaches its retracted position for withdrawal of the rod to enable indexing of the table.

3. Apparatus for winding and placing coils in the slots of a stator comprising a rotary index table, a plurality of placer heads carried by the table spaced at equal intervals therearound and extending upward therefrom, each placer head being adapted to hold coils for placement in the slots of a stator applied to the placer head, means for indexing the table to index the placer heads from a transfer station to a placing station and to index the placer heads from the placing station back to the transfer station, a rotary winding head extending over the table at the transfer station, a plurality of coil form means carried by the winding head spaced at equal intervals therearound and extending downward therefrom, means for indexing the winding head to index the coil form means from a winding station to the transfer station and to index the coil form means from the transfer station back to the winding station, means at the winding station for winding a wire into coils on the coil form means at the winding station, means for transferring coils from the coil form means at the transfer station downward to the placer head at the transfer station, and means at the placing station for pushing the coils from the placer head at the placing station into the slots of a stator applied to that placer head.

4. Apparatus as set forth in caim 3 wherein each coil form means comprises a pair of coil forms located adjacent one another adapted for winding thereon of two sets of coils to constitute two pole windings for a stator, said winding head being adapted for indexing each pair of coil forms from the winding station to the transfer station for transfer of the two pole windings thereon to the placer head at the transfer station.

5. Apparatus as set forth in claim 4 wherein each coil form embodies means for the winding thereon of coils of different sizes.

6. Apparatus as set forth in claim 4 wherein each coil form comprises a first set of pins for the winding thereon of a coil of smallest size, and additional successive sets of pins for successive winding of coils of successively larger sizes, and means for successively moving each successive set of pins from a retracted position to a winding position defining a winding configuration surrounding the preceding set of pins.

7. Apparatus as set forth in claim 5 wherein said winding means comprises a rotatable flyer for winding a wire into coils first around one of the coil forms and then around the other of the coil forms of the pair of coil forms at the winding station.

8. Apparatus as set forth in claim 7 wherein the flyer is shiftable between a first position for winding coils on said one of the coil forms of the pair of the winding station and a second position for winding coils on the other of the coil forms of the pair at the winding station.

9. Apparatus as set forth in claim 8 having means for traversing the flyer for level winding of the wire on the coil forms at the winding station.

10. Apparatus as set forth in claim 9 wherein each coil form is carried by the winding head for vertical movement relative to the winding head between a raised retracted position and a lowered winding position and having means for effecting raising and lowering of each coil form, whereby each one of the coil forms at the winding station may be raised to its retracted position for winding of coils on the other coil form at the winding station with the latter coil form in its lowered winding position.

11. Apparatus as set forth in claim 10 wherein the pair of coil forms at the transfer station is adapted to be lowered by their respective raising and lowering means into engagement with the placer head at the transfer station for transfer of coils and then raised to clear said placer head, and wherein each coil form includes a stripper for pushing the coils wound thereon down off the coil form onto said placer head.

12. Apparatus as set forth in claim 11 wherein each coil form comprises a carriage and means mounting the carriage for vertical movment relative to the winding head between a raised position and a lowered position, a first set of pins extending down from the carriage for the winding thereon of a coil of the smallest size, additional successive sets of pins mounted on the carriage for movement with the carriage and for movement relative to the carriage for successive winding of coils of successively larger sizes, means for successively moving each successive set of pins from a raised retracted position relative to the carriage to a lowered winding position relative to the carriage defining a winding configuration surrounding the preceding set of pins, and means for moving each carriage and the associated pins between its raised retracted position and its lowered position for winding of coils thereon at the winding station, and for transfer of coils therefrom to a placer head at the placer station.

13. Apparatus as set forth in claim 12 having means mounting certain of the pins in each set of pins for movement with respect to others of the pins in the set between an expanded winding position and a contracted position, mans for effecting said movement of said certain pins, and a stripper for pushing coils off the pins when said certain pins are contracted.

14. A coil winding comprising a rotatable flyer, a first arbor around which a wire may be wound into a coil by the flyer, and at least one additional arbor of larger size than the first arbor movable in axial direction relative to the first arbor between a retracted position clear of the first arbor for winding of the wire by the flyer into a coil on the first arbor and a winding position defining a winding configuration surrounding the first arbor for winding of the wire by the flyer into a second coil on the second arbor, means mounting said first arbor at one end thereof with its other end thereof for stripping a coil off its said second end, means mounting said second arbor at one end thereof for said movement relative to the first arbor with its other end free for stripping a coil off its said other end, each arbor including at least one member which is movable between an expanded winding position and a collapsed position for strippping of a coil therefrom and having means for moving said member between its said positions, and stripper means past which said first arbor extends and past which said second arbor extends when it is in its winding position for stripping coils from both the first and second arbors by relative movement of said stripper means and arbors after collapsing of said arbors.

15. Apparatus for winding coils for placement in the slots of a stator comprising a rotary winding head, at least two coil form means carried by the winding head spaced at intervals therearound, means for indexing the winding head to index the coil form means from a winding station to a transfer station and to index the coil form means from the transfer station back to the winding station, each coil form means comprising a first arbor around which a wire may be wound into a coil and at least one additional arbor of larger size than the first arbor movable in axial direction relative to the first arbor between a retracted position clear of the first arbor for winding the wire into a coil on the first arbor and a winding position defining a winding configuration surrounding the first arbor for winding of the wire into a second coil on the second arbor, means mounting said first arbor at one end thereof on said winding head with the other end of said first arbor free for stripping a coil off its said other end, means mounting said second arbor at one end thereof on said winding head for said movement relative to the first arbor with the other end of said second arbor free for stripping a coil off its said other end, each arbor incuding at least one member which is movable between an expanded winding position and a collapsed position for stripping of a coil therefrom and having means for moving said members between its said positions, and stripper means past which said first arbor extends and past which said second arbor extends when it is in its winding position for stripping coils from both the first and second arbors after collapsing of said arbors, means at the winding station for winding a wire into a coil on the first arbor of the coil form means at the winding station, and then, after movement of the respective second arbor to its winding position, winding the wire into a second coil on the second arbor, and means operable at the transfer station for effecting stripping of the coils from the collapsed arbors by relative movement of said stripper mean and arbors and transfers of the coils to a set of fingers.

* * * * *